US007783121B1

(12) United States Patent
Cox

(10) Patent No.: US 7,783,121 B1
(45) Date of Patent: Aug. 24, 2010

(54) METHOD AND APPARATUS FOR APPLYING A FILTER TO AN IMAGE WITH A LARGE RANGE OF PIXEL VALUES

(75) Inventor: Christopher B. Cox, San Jose, CA (US)

(73) Assignee: Adobe Systems Incorporated, San Jose, CA (US)

(*) Notice: Subject to any disclaimer, the term of this patent is extended or adjusted under 35 U.S.C. 154(b) by 1160 days.

(21) Appl. No.: 11/406,634

(22) Filed: Apr. 18, 2006

Related U.S. Application Data

(63) Continuation-in-part of application No. 11/292,184, filed on Nov. 29, 2005.

(51) Int. Cl.
*G06K 9/40* (2006.01)
(52) U.S. Cl. ............... 382/254; 382/260; 382/264; 382/274; 345/617
(58) Field of Classification Search ......... 382/167–169, 382/254, 260–264, 274; 345/617
See application file for complete search history.

(56) References Cited

U.S. PATENT DOCUMENTS

| | | | |
|---|---|---|---|
| 5,426,684 A * | 6/1995 | Gaborski et al. ............... | 378/62 |
| 5,875,040 A | 2/1999 | Tomasc | |
| 6,163,621 A * | 12/2000 | Paik et al. .................... | 382/169 |
| 6,404,918 B1 | 6/2002 | Hel-or et al. | |
| 6,816,197 B2 | 11/2004 | Keshet et al. | |
| 7,146,059 B1 | 12/2006 | Durand et al. | |
| 7,426,312 B2 * | 9/2008 | Dance et al. ................. | 382/254 |
| 2005/0025378 A1 | 2/2005 | Maurer | |

OTHER PUBLICATIONS

Tomasi, C.; Manduchi, R.; Bilateral filtering for gray and color images. Computer Vision, 1998. Sixth International Conference on Jan. 4-7, 1998 pp. 839-846.*

(Continued)

*Primary Examiner*—Vikkram Bali
*Assistant Examiner*—Julian D Brooks
(74) *Attorney, Agent, or Firm*—Robert C Kowert; Meyertons, Hood, Kivlin, Kowert & Goetzel, P.C.

(57) ABSTRACT

One embodiment of the present invention provides a system for applying a filter to an image whose pixel values can span a large range of values. During operation the system receives an image to which the filter is to be applied. The system then selects a first region within the image which is associated with a first pixel. Next, the system generates a first histogram using pixels within the first region whose values are within a first range of pixel values. Next, the system determines a new value for the first pixel using the first histogram. The system then selects a second region within the image which is associated with a second pixel. Next, the system determines if the second pixel value is within a second range of pixel values. If the second pixel value is within the second range of pixel values, the system determines a non-overlapping region between the first region and the second region. The system then generates a second histogram using the first histogram and pixel values in the non-overlapping region. Next, the system determines a new value for the second pixel using the second histogram.

17 Claims, 5 Drawing Sheets

OTHER PUBLICATIONS

Choudhury, P.; Tumblin, J.; The trilateral filter for high contrast images and meshes. Proc. of the Eurographics Symposium on Rendering, Per. H. Christensen and Daniel Cohen eds., 2003, pp. 186-196.*

"Fast Bilateral Filtering for the Display of High-Dynamic-Range Images"; Fredo Durand, Julie Dorsey; Jul. 2002; ACM Transactions on Graphics (TOG), Proceedings of the 29th Annual Conference on Computer Graphics and Interactive Techniques SIGGRAPH '02 vol. 21 Issue 3; 10 pages.

* cited by examiner

METHOD AND APPARATUS FOR APPLYING A FILTER TO AN IMAGE WITH A LARGE RANGE OF PIXEL VALUES

RELATED APPLICATION

This application is a continuation-in-part of, and hereby claims priority under 35 U.S.C. §120 to, U.S. patent application Ser. No. 11/292,184, entitled, "FAST BILATERAL FILTERING USING RECTANGULAR REGIONS," by inventor Christopher B. Cox, filed on 29 Nov. 2005.

BACKGROUND

1. Field of the Invention

The present invention relates to systems and techniques for manipulating digital images. More specifically, the present invention relates to a method and an apparatus for applying a filter to an image whose pixel values can span a large range of values.

2. Related Art

One of the problems in displaying a "real world" scene is that the dynamic range of color intensity values which are present in the "real world" scene often greatly exceeds the dynamic range of display mediums which are typically used to display the scene. A technique called HDR (High Dynamic Range) tone mapping is typically used to solve this problem. HDR tone mapping techniques can be used for reducing the dynamic range of such "real world" scenes so that they can be effectively displayed on media, such as hard-copy prints, CRT/LCD displays, and projectors. These techniques usually attempt to reduce the contrast of a natural scene so that it can be displayed on a specific display medium, while preserving image details which are critical to appreciate the original scene content.

One of the techniques for HDR tone mapping involves applying a "bilateral filter" to an image. A bilateral filter is a filter that computes a new value of a pixel in the image based on the spatial closeness as well as the photometric similarity of other pixels in the image. In other words, a bilateral filter may compute a new pixel value based on the values of neighboring pixels (spatial closeness) which have values that are similar (photometric similarity) to the original pixel.

Unfortunately, prior art techniques for applying a bilateral filter to an image can require a large amount of computation. Prior art techniques typically use an approximation to a Gaussian function as the spatial component of the bilateral filter. Hence, to update a given pixel these techniques need to compute the individual contributions of each neighboring pixel during the bilateral computation. Because the range of interest is a two-dimensional area, these techniques typically require $O(n^2)$ operations for each pixel, where n is the radius (in number of pixels) of the filter. (Big "O" notation, e.g., $O(n^2)$, is commonly used to describe the asymptotic time and/or space complexity of software processes.) This is why prior art techniques can be very slow, especially when the filter radius is large.

These performance problems are not limited to bilateral filters. For example, prior art techniques for applying a trilateral filter to an image also suffer from similar performance problems. (A trilateral filter computes a new pixel value based on the spatial closeness, photometric similarity, and the gradients of neighboring pixel values.)

A system to speed up bilateral (or trilateral) filtering using histogram based techniques was described in U.S. patent application Ser. No. 11/292,184, entitled, "FAST BILATERAL FILTERING USING RECTANGULAR REGIONS" (hereinafter "Cox"). However, histogram based techniques typically speed up the filtering operation when the input data set (e.g., pixel values) spans a relatively small range of integral values. Hence, the invention of Cox may not substantially speed up bilateral filtering when the input data set spans a large range of integral or floating point values.

Hence, what is needed is a method and an apparatus for applying a filter to an input data set (e.g., pixel values) which can span a large range of integral or floating point values without the above-described performance problems.

SUMMARY

One embodiment of the present invention provides a system for applying a filter to an image whose pixel values can be floating point numbers or integers that span a large range of values. During operation the system receives an image to which the filter is to be applied. The system then selects a first region within the image which is associated with a first pixel. Next, the system generates a first histogram using pixels within the first region whose values are within a first range of pixel values. The first range of pixel values can be greater than the range of pixel values on which the filter operates. The system then determines a new value for the first pixel using the first histogram.

In a variation on this embodiment, the system selects a second region within the image which is associated with a second pixel. The system then determines if the second pixel value is within a second range of pixel values. If the second pixel value is within the second range of pixel values, the system determines a new value for the second pixel by: determining a non-overlapping region between the first region and the second region; generating a second histogram using the first histogram and pixel values in the non-overlapping region; and determining the new value for the second pixel using the second histogram.

In a variation on this embodiment, the system determines the second range of pixel values using the first range of pixel values and the range of pixel values on which the filter operates.

In a variation on this embodiment, the system generates the second histogram by first setting the frequency values of the second histogram to be equal to the frequency values of the first histogram. The system then adjusts the frequency values of the second histogram by: increasing the frequencies of pixel values that are in the second region, but are not in the first region; and decreasing the frequencies of pixel values that are in the first region, but are not in the second region.

In a variation on this embodiment, the filter can be a bilateral filter or a trilateral filter.

In a variation on this embodiment, the system is used for HDR tone mapping.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Filters

Figure 1A:
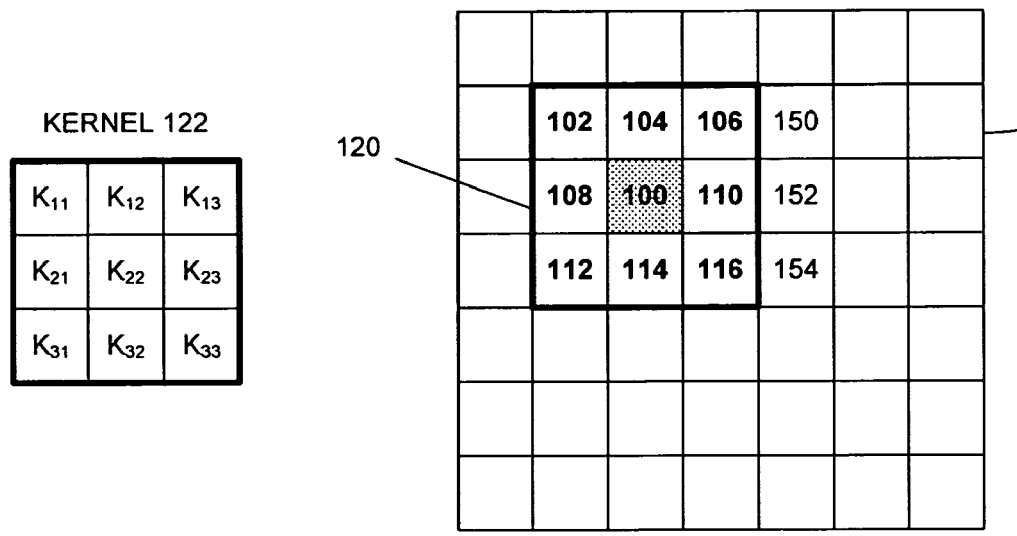
FIG. 1A and 1B illustrate how a filter can be applied to an image in accordance with an embodiment of the present invention.
Figure 1B:
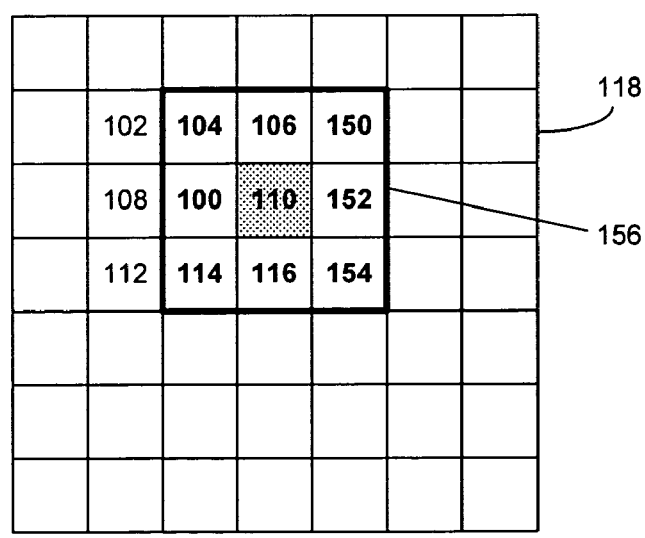

FIGS. 1A and 1B illustrate how a filter can be applied to an image in accordance with an embodiment of the present invention.

A digital image usually comprises a number of pixels. For example, FIG. 1A illustrates a portion 118 of a digital image that comprises a number of pixels, which include pixels 102, 104, 106, 108, 110, 112, 114, 116, 150, 152, and 154. Note that each pixel is usually associated with a number of attributes. Specifically, in color images, a pixel is usually associated with the intensities of the color channels.

When a filter is applied to an image, it computes new attribute values for a pixel based on the current attribute values of the pixel and attribute values of neighboring pixels. Note that a filter typically has a radius (or region of interest) which identifies the neighboring pixels that are used for computing the new attribute values. For example, the filter's computation may be restricted to the pixels within the rectangular region 120 shown in FIG. 1A.

A filter is typically applied to an image by convolving a kernel, such as kernel 122, with the image. Kernel 122 comprises kernel coefficients $K_{11}$, $K_{12}$, $K_{13}$, $K_{21}$, $K_{22}$, $K_{23}$, $K_{31}$, $K_{32}$, and $K_{33}$. In one embodiment, a new (attribute) value for pixel 100 in FIG. 1A may be computed by centering kernel 122 on pixel 100, and summing the products of the pixel values with their corresponding kernel coefficients. For example, pixel 102's value is multiplied with its corresponding kernel coefficient $K_{11}$, pixel 104's value is multiplied with its corresponding kernel coefficient $K_{12}$, and so forth. These product terms are then added up to obtain the new value for pixel 100.

Bilateral and Trilateral Filters

Kernel coefficients of a domain filter depend only on the spatial closeness of pixel locations. For example, if kernel 122 was a domain filter, coefficient $K_{11}$ would be determined based on the distance between pixel 102 (which corresponds to coefficient $K_{11}$), and pixel 100. The Gaussian filter and the mean filter are examples of domain filters.

On the other hand, kernel coefficients of a range filter depend only on the photometric similarity (i.e., similarity of pixel values) of pixels. For example, if kernel 122 was a range filter, coefficient $K_{11}$ would be determined based on the similarity between pixel 102's value and pixel 100's current value. Note that the spatial closeness of the pixels plays no role in determining the kernel coefficient for a range filter.

A bilateral filter combines both domain filtering and range filtering. In other words, the kernel coefficients of a bilateral filter depend both on the spatial closeness and the photometric similarity of the pixels. For example, if kernel 122 was a bilateral filter, coefficient $K_{11}$ would be determined based on (i) the distance between pixel 102 and pixel 100, and (ii) the similarity between pixel 102's value and pixel 100's current value.

A trilateral filter is similar to a bilateral filter in that it also combines both domain filtering and range filtering. However, the kernel coefficients in a trilateral filter also depend on the pixel-value gradients. For example, if kernel 122 was a trilateral filter, coefficient $K_{11}$ would be determined based on (i) the distance between pixel 102 and pixel 100, (ii) the similarity between pixel 102's value and pixel 100's current value, and (iii) the pixel-value gradient at pixel 102.

Unfortunately, prior art techniques for applying a bilateral or trilateral filter are very slow. Prior art bilateral filters usually combine a Gaussian filter (spatial filter) with a range filter. To apply a bilateral filter that contains a Gaussian component, the system needs to determine the contribution of each pixel within the kernel radius. As a result, prior art techniques require $O(n^2)$ operations to compute a new pixel value, where n is the kernel radius. (Big "O" notation, e.g., $O(n^2)$, is used to describe the asymptotic complexity of software processes.) In other words, prior art techniques asymptotically require order $n^2$ operations to compute a new pixel value.

For example, prior art techniques would determine the new value of pixel 110 in FIG. 1B by calculating the contribution of all the pixels within the rectangular region 156, namely pixels 104, 106, 150, 100, 110, 152, 114, 116, and 154. It will be evident that computing the new value of pixel 110 requires $O(n^2)$ operations, where n is the filter radius (i.e., distance from the center to one of the sides of the rectangular region).

In contrast, one embodiment of the present invention applies a bilateral filter to an image using substantially less computation than prior art techniques. Specifically, the embodiment requires only $O(n)$ operations to compute a new value for a pixel.

Two important aspects enable the present invention to substantially reduce the amount of computation. First, the present invention uses a 2-D box filter (instead of a Gaussian filter) as the spatial component in the bilateral filter. Second, the present invention uses histogram techniques to speed up computation of the new pixel values. In other words, the present invention can speed up computation because it uses a 2-D box filter as the spatial component. In contrast, if the spatial component was Gaussian, it would not be possible to use histogram techniques to speed up computation.

Fast Bilateral or Trilateral Filtering

Figure 2:
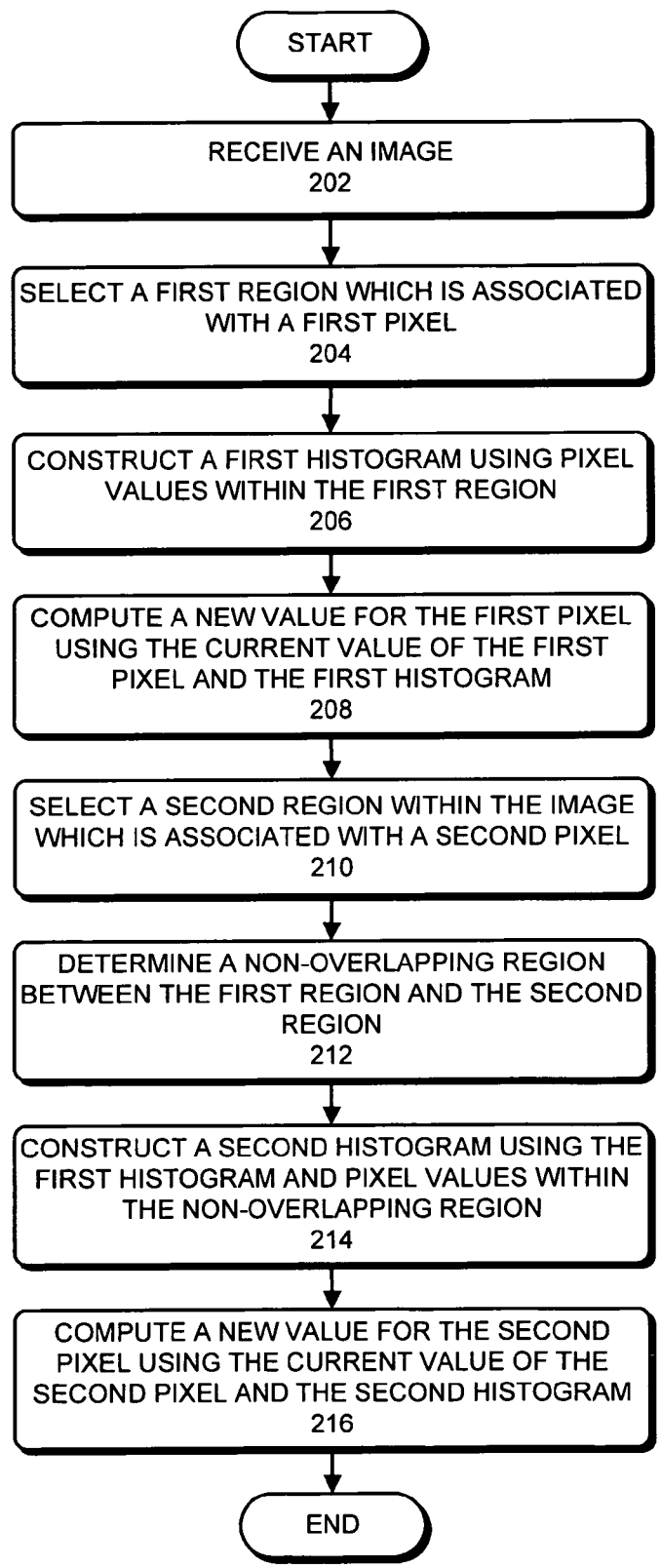
FIG. 2 presents a flowchart that illustrates a process for applying a bilateral filter to an image in accordance with an embodiment of the present invention.

FIG. 2 presents a flowchart that illustrates a process for applying a bilateral filter to an image in accordance with an embodiment of the present invention.

The process begins by receiving an image (step 202). For example, the system may receive image 118 shown in FIG. 1A.

The system then selects a first region within the image which is associated with a first pixel (step 204).

Specifically, in one embodiment, the system may select rectangular region 120 which associated with the center pixel 100. Selecting a rectangular region is equivalent to applying a 2-D box filter to the image. In other words, the spatial component (2-D box filter) of the bilateral filter is applied at this step. (For ease of discourse, we use rectangular regions to describe the present invention. However, the present invention is not limited to using rectangular regions. For example, in one embodiment, the first region can have an arbitrary shape.)

Next, the system constructs a first histogram using the pixel values within the first region (step 206).

Figure 3A:
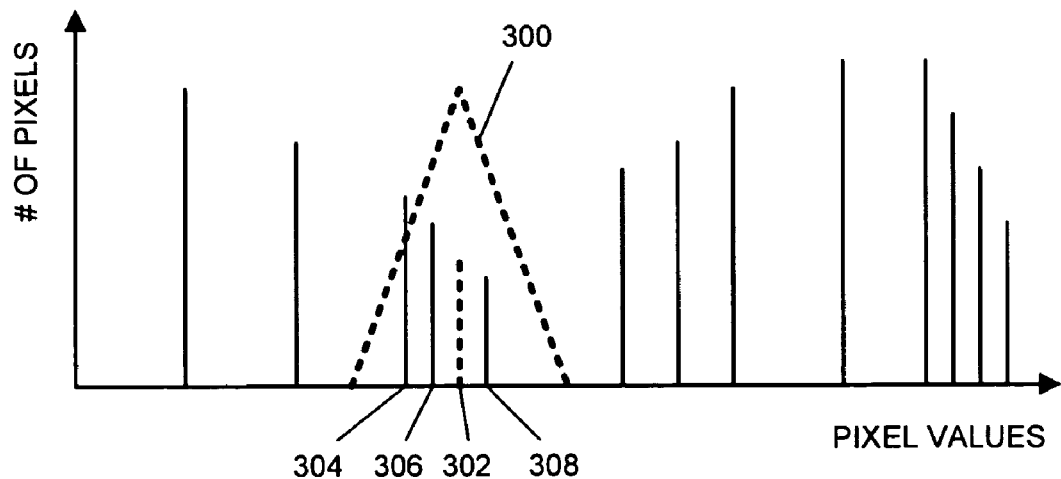
FIGS. 3A and 3B illustrate histograms that the system may construct from an image in accordance with an embodiment of the present invention.
Figure 3B:
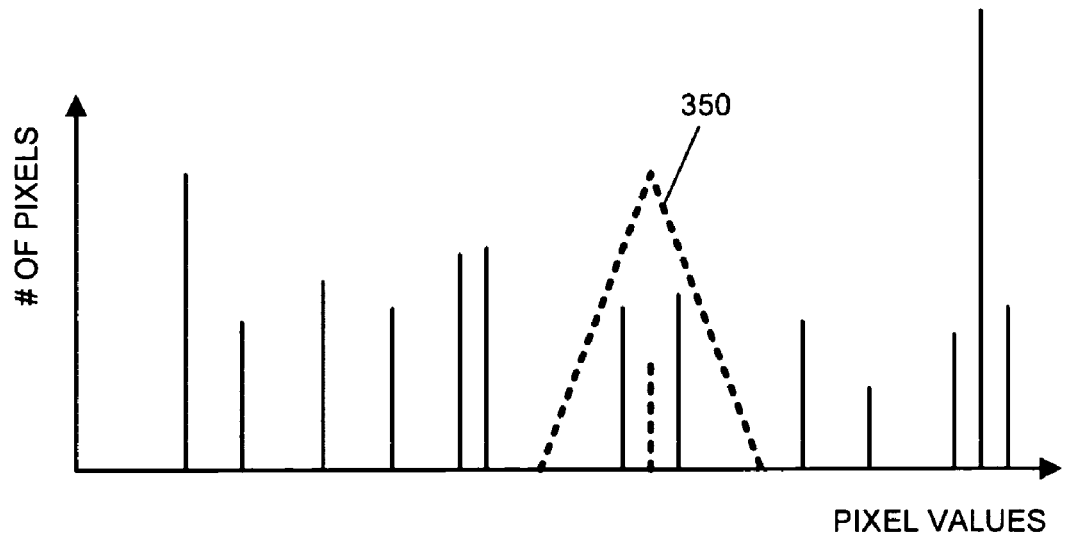

FIGS. 3A and 3B illustrate histograms that the system may construct from an image in accordance with an embodiment of the present invention. Note that the histograms plot the frequency of each pixel value against the respective pixel values.

The system then computes a new value for the first pixel using the current value of the pixel and the first histogram (step 208).

Note that the system can apply a variety of filters to the histogram to compute a new value for the pixel. Specifically, in one embodiment, the system applies a triangular filter to the histogram that is centered at the pixel value. In another embodiment, the system applies a 1-D box filter to the histogram that is centered at the pixel value.

For example, the system may apply triangular filter 300 which is centered at pixel value 302 to the histogram shown in FIG. 3A. Note that pixel value 302 is the current value of the pixel for which a new pixel value is being computed.

Applying a triangular filter to the histogram is equivalent to convolving a kernel with the image. For example, suppose a new value for pixel 100 is being computed. Let pixel values 304, 306, and 308 in FIG. 3A correspond to pixels 104, 106, and 108 in FIG. 1A, respectively. Additionally, suppose that pixels 102, 110, 112, 114, and 116 have pixel values that fall outside the range of the triangular filter 300 shown in FIG. 3A. In this case, applying triangular filter 300 to the histogram shown in FIG. 3A is equivalent to convolving with a kernel, such as kernel 122, wherein the kernel coefficient associated with a pixel has a value that is equal to the triangular filter's value for the associated pixel. For example, in this case, kernel coefficients $K_{11}$, $K_{23}$, $K_{31}$, $K_{32}$, and $K_{33}$ are zero because they are associated with pixels 102, 110, 112, 114, and 116, whose values lie outside the triangular filter's range. On the other hand, kernel coefficients $K_{12}$, $K_{13}$, $K_{21}$, and $K_{22}$ are non-zero, and are equal to the triangular filter values that are associated with pixel values 304, 306, and 308, respectively, which are associated with pixels 104, 106, and 108, respectively.

Continuing with FIG. 2, the system selects a second region within the image which is associated with a second pixel (step 210).

For example, the system may select rectangular region 156 shown in FIG. 1B which is associated with pixel 110. Recall that selecting a rectangular region is equivalent to applying a 2-D box filter to the image.

The system then determines a non-overlapping region between the first region and the second region (step 212).

For example, the non-overlapping region between region 120 and region 156 comprises pixels 102, 108, 112, 150, 152, and 154.

Next, the system constructs a second histogram using the first histogram and the pixel values in the non-overlapping region (step 214).

Since the present invention uses the pixel values in the non-overlapping region to update the second histogram, it can substantially reduce the number of computations required to determine the new value for the second pixel. (In contrast, prior art techniques need to use all the pixels in the second region to compute the new value for the second pixel.)

Specifically, in one embodiment, the system first sets the frequency values of the second histogram to be equal to the frequency values of the first histogram. The system then adjusts the frequencies of the second histogram by: increasing the frequencies of pixel values that are in the second region, but are not in the first region, and decreasing the frequencies of pixel values that are in the first region, but not in the second region.

For example, the system can reduce the frequencies of pixel values corresponding to pixels 102, 108, and 112, and increase the frequencies of pixel values corresponding to pixels 150, 152, and 154.

The system then computes a new value for the second pixel using the current value of the second pixel and the second histogram (step 216).

For example, the system may compute the new value for the second pixel by applying triangular filter 350 to the second histogram shown in FIG. 3B. The position of the triangular filter depends on the value of the pixel for which a new value is being computed. For example, triangular filter 300 and triangular filter 350 are centered at different pixel values.

In other words, in one embodiment of the present invention, the spatial component of the bilateral filter is a 2-D box filter. Note that this is an important, non-obvious insight because it allows the present invention to exploit histogram techniques to substantially reduce the amount of computation. In contrast, in prior art methods, since the spatial component of the bilateral filter is usually Gaussian, histogram techniques cannot be used to speed up the computation. More generally, if the spatial component is a function that assigns different weights to the pixels based on their location, computation cannot be speeded up substantially using histogram techniques.

Fast Filtering with Floating Point Data

Histogram based techniques typically speed up the filtering operation when the input data set (e.g., pixel values) spans a relatively small range of integral values. However, histogram techniques may not substantially speed up bilateral filtering when the input data set spans a large range of integral or floating point values.

The number of bins in the histogram usually depends on (1) the granularity of the bins, and (2) the range of values in the data set. The granularity of the bins is usually dictated by the required level of accuracy. Increasing the granularity of the bins (i.e., decreasing the bin size) increases accuracy, but it also increases the number of bins. However, if the number of bins is very large, it can decrease the efficiency of histogram based techniques. Histogram techniques typically require a large number of bins when the application requires high accuracy and the input data set spans a large range of integral or floating point values. Hence, prior art histogram techniques may not work efficiently when the input data set spans a large range of integral or floating point values.

One embodiment of the present invention facilitates using histogram techniques in data processing applications when the input data set spans a large range of integral or floating point values. Specifically, one embodiment of the present invention uses histogram techniques to substantially speed up data processing (e.g., bilateral or trilateral filtering) when the input data set spans a large range of integral or floating point values.

Figure 4:
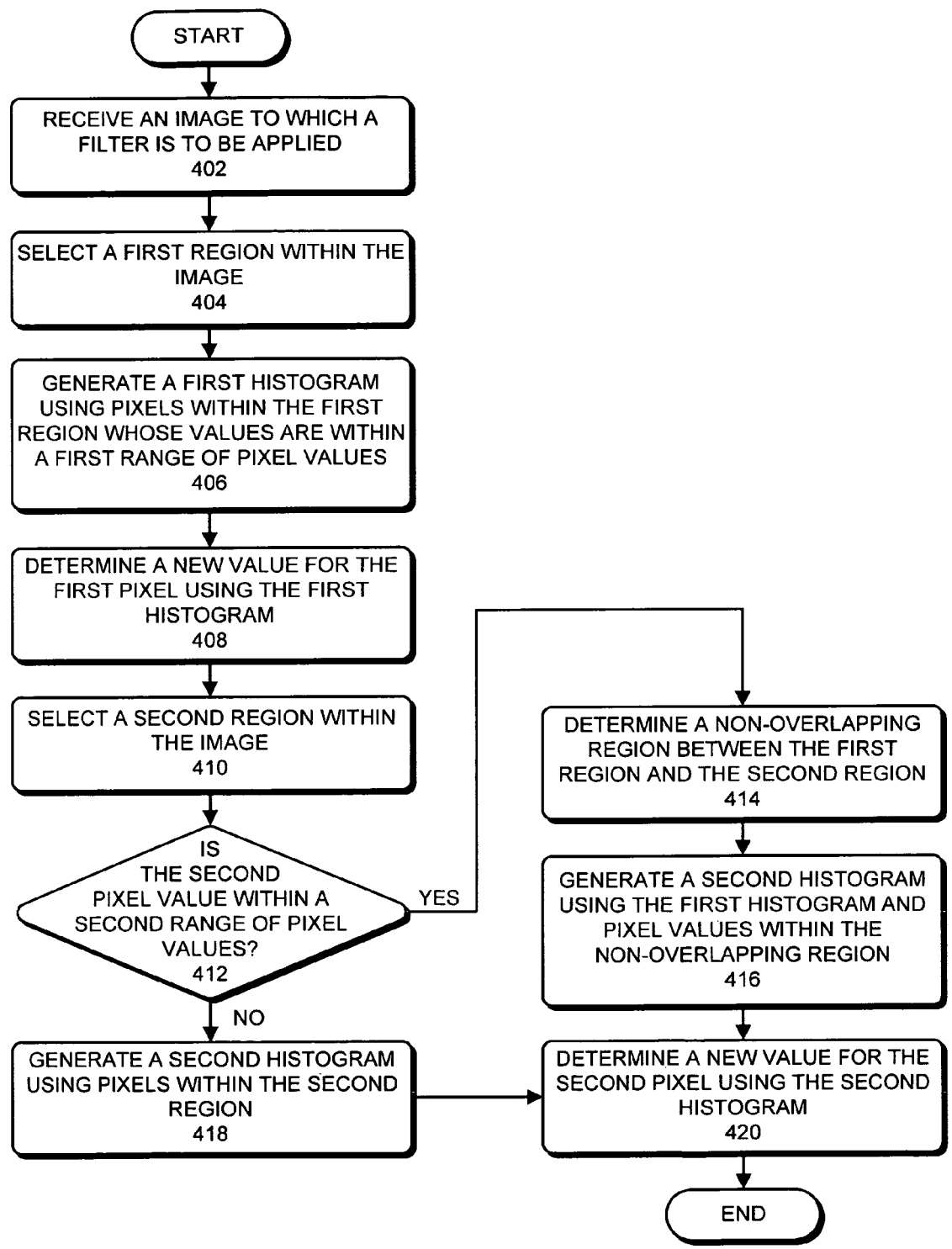
FIG. 4 presents a flowchart that illustrates a process for using a histogram to substantially speed up data processing when the input data set spans a large range of integral or floating point values in accordance with an embodiment of the present invention.

FIG. 4 presents a flowchart that illustrates a process for using a histogram to substantially speed up data processing when the input data set spans a large range of integral or floating point values in accordance with an embodiment of the present invention.

The process typically begins by receiving an image to which a filter is to be applied (step 402).

In one embodiment the process is performed during HDR tone mapping. The filter can be a bilateral or trilateral filter. The pixel values in the image can be represented by floating point numbers or integers, and the range of pixel values can be substantially large.

Next, the system selects a first region within the image which is associated with a first pixel (step 404).

For example, the system may receive an image that contains image portion 118 shown in FIG. 1A. The system may select region 120 which associated with the center pixel 100. Selecting a region is equivalent to applying a 2-D box filter to the image. In other words, the spatial component (2-D box filter) of a bilateral filter can be applied at this step.

The system then generates a first histogram using pixels within the first region whose values are within a first range of pixel values, wherein the first range of pixel values can be greater than the range of pixel values on which the filter operates (step 406).

Figure 5A:
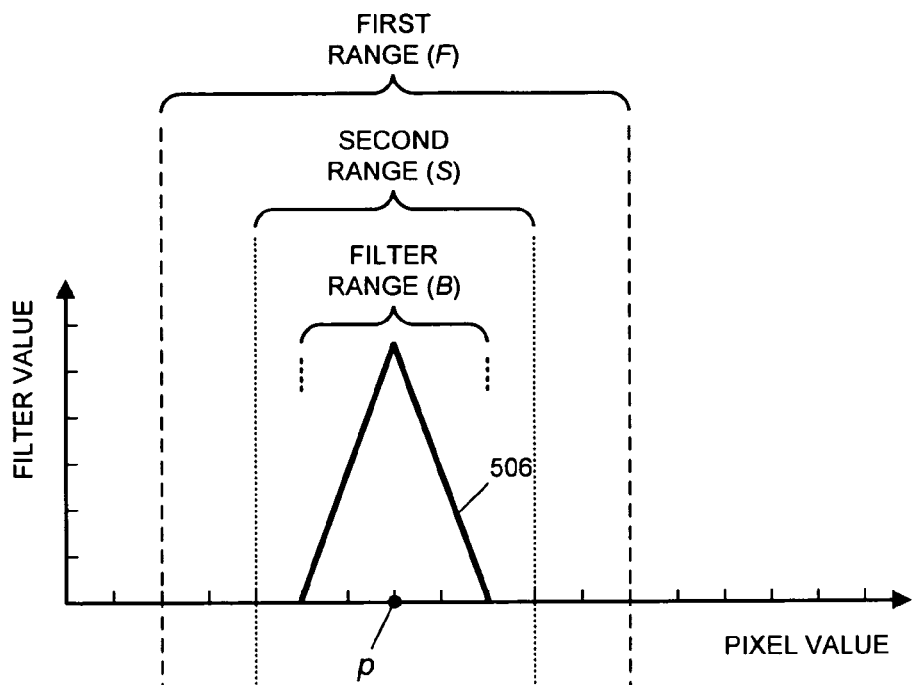
FIG. 5A illustrates a first range of pixel values which is greater than the range of pixel values on which the filter operates in accordance with an embodiment of the present invention.

FIG. 5A illustrates a first range of pixel values which is greater than the range of pixel values on which the filter operates in accordance with an embodiment of the present invention.

Filter 506 is centered at the center pixel value p (which is the value of the pixel for which a new pixel value is being computed), and operates over a range B of pixel values. For example, center pixel value p can correspond to the value of pixel 100 in FIG. 1A. As shown in FIG. 5A, filter 506 can operate on pixel values that lie within the interval (p−B/2, p+B/2).

The first range of pixel values, F, can be greater than the filter range B. If p is the value of the center pixel, and F is the first range of pixel values, the system can generate the first histogram using pixels within the first region whose values lie in the interval (p−F/2, p+F/2).

Generating a histogram from scratch can take up to $O(n^2)$ operations because the system may need to read all the pixel values within the region. However, as described below, the system can generate subsequent histograms using substantially less computation.

Continuing with FIG. 4, the system determines a new value for the first pixel using the first histogram (step 408).

For example, in FIG. 5A, the system can determine a new value of the first pixel by applying filter 506 which is centered on pixel value p (which corresponds to the value of first pixel 100) to the first histogram (not shown).

The system then selects a second region within the image which is associated with a second pixel (step 410).

For example, the system may select region 156 shown in FIG. 1B which is associated with pixel 110.

Next, the system determines if the second pixel value is within a second range of pixel values (step 412).

In one embodiment, the second range of pixel values is determined using the first range of pixel values and the filter range. In FIG. 5A, if B is the filter range (i.e., the range of pixel values on which the filter operates), and F is the first range of pixel values, the second range of pixel values, S, can be determined using the expression S=(F−B). In other words, if p is the center pixel value, the second range of pixel values, S, can cover the interval $$\left(p - \frac{F-B}{2}, p + \frac{F-B}{2}\right).$$

The second range of pixel values can be used for determining whether we need to generate the second histogram from scratch, or whether we can speed up computation by generating the second histogram using the first histogram.

If the second pixel value is within the second range of pixel values, the system can determine a new value for the second pixel by first determining a non-overlapping region between the first region and the second region (step 414).

The system can then generate a second histogram using the first histogram and pixel values in the non-overlapping region (step 416).

In one embodiment, the system generates the second histogram by first setting the frequency values of the second histogram to be equal to the frequency values of the first histogram. The system can then adjust the frequency values of the second histogram by: increasing the frequencies of pixel values that are in the second region, but are not in the first region, and decreasing the frequencies of pixel values that are in the first region, but are not in the second region.

On the other hand, if the second pixel value is not within the second range of pixel values, the system may generate the second histogram using the pixels in the second region (step 418).

Figure 5B:
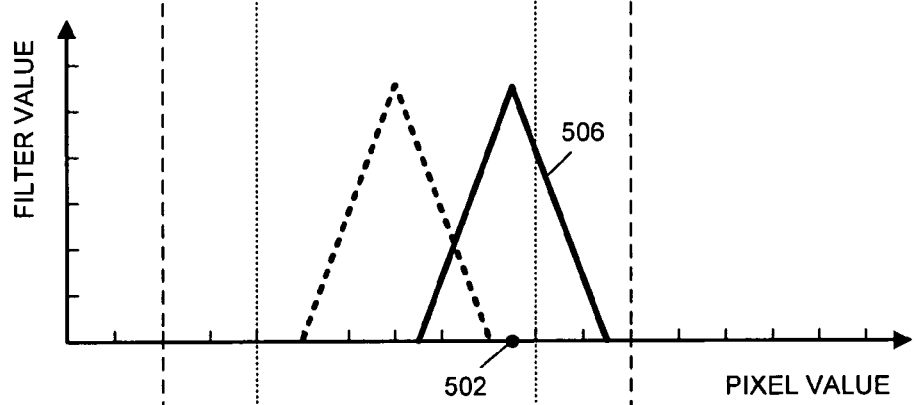
FIGS. 5B and 5C illustrate how a second range of pixel values can be used for determining whether we may need to generate the second histogram from scratch, or whether we can speed up computation by generating the second histogram using the first histogram in accordance with an embodiment of the present invention.
Figure 5C:
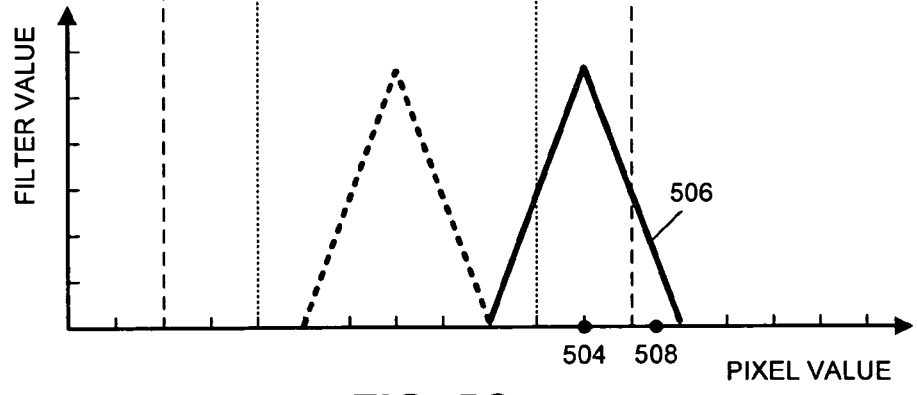

FIGS. 5B and 5C illustrate how a second range of pixel values can be used for determining whether we may need to generate the second histogram from scratch, or whether we can speed up computation by generating the second histogram using the first histogram in accordance with an embodiment of the present invention.

Let pixel 110 in FIG. 1B be the second pixel, and region 156 be the second region. Recall that the first histogram was generated using pixels within region 120 whose values were within the interval (p−F/2, p+F/2).

First, consider the case when the second pixel value is within the second range of pixel values, namely $$\left(p - \frac{F-B}{2}, p + \frac{F-B}{2}\right).$$

Specifically, let pixel value 502 in FIG. 5B be the value of second pixel 110. Filter 506 will now be centered at pixel value 502 as shown in FIG. 5B. In this scenario, all the pixel values within filter 506's range have already been accounted for in the first histogram because the filter lies entirely within the interval (p−F/2, p+F/2) as shown in FIG. 5B. This is why we can use the first histogram to generate the second histogram when the second pixel value is within the second range of pixel values. In particular, the second histogram can be generated by starting with the first histogram, and then adjusting the frequencies of the pixel values in the non-overlapping region. Since the non-overlapping region can contain substantially fewer pixels than the second region, this approach can substantially reduce the amount of computation required for generating the second histogram.

Next, consider the case when the second pixel value is not within the second range of pixel values. Specifically, let pixel value 504 in FIG. 5C be the value of second pixel 110. Note that pixel value 504 is outside the second range of pixel values (S). Filter 506 will now be centered at pixel value 504 as shown in FIG. 5C. In this scenario, while generating the first histogram, the system may have ignored pixel values which lie within filter 506's range. For example, let pixel 116 in FIG. 1A have pixel value 508 as shown in FIG. 5C. Note that pixel value 508 lies outside the first range of pixel values (F). When the first histogram was generated, pixel value 508 was ignored because, even though pixel 116 was within the first region 120, pixel 116's value (i.e., pixel value 508) did not lie within the first range of pixel values (F), i.e., the interval (p−F/2, p+F/2). However, pixel value 508 must be accounted for in the second histogram because it is within the filter 506's range as shown in FIG. 5C. Furthermore, since pixel 116 is in the overlapping region between the first region 120 and the second region 156, pixel value 508 will remain unaccounted for if we generate the second histogram using the non-overlapping regions only. Hence, in such scenarios, we may need to generate the second histogram from scratch by using the pixels in the second region.

Finally, as shown in FIG. 4, the system determines a new value for the second pixel using the second histogram (step 420).

The foregoing descriptions of embodiments of the present invention have been presented only for purposes of illustration and description. They are not intended to be exhaustive or to limit the present invention to the forms disclosed.

For example, the instant application describes the present invention using a bilateral filter. However, the present invention is also applicable to any data processing operation that has a value region of interest. Likewise, although the present invention has been described in the context of image processing applications, the systems and techniques described in the instant application can be used to speed up data processing of any input data set (e.g., audio data).

Accordingly, many modifications and variations will be apparent to practitioners skilled in the art. Additionally, the above disclosure is not intended to limit the present invention. The scope of the present invention is defined by the appended claims.

What is claimed is:
1. A method, comprising:
performing by a computer:
receiving an image to which a filter is to be applied, wherein the image comprises a plurality of pixels each having a respective pixel value; and
applying the filter to a first pixel in the image, wherein the filter comprises a spatial filter and a range filter, and wherein said applying comprises:
applying the spatial filter, wherein said applying the spatial filter comprises selecting a first region of pixels within the image, wherein the first region contains a plurality of pixels including the first pixel;
determining a first range of pixel values including the pixel value for the first pixel, wherein the first range is greater than a range of pixel values on which the range filter operates;
generating a first histogram using pixels within the first region whose respective pixel values are within the first range of pixel values, wherein the first histogram comprises a plurality of bins, wherein each bin represents a frequency of pixels within the first region having pixel values corresponding to that bin, wherein pixels within the first region whose respective pixel values are not within the first range of pixel values are not represented in the first histogram; and
determining a new value for the first pixel using the first histogram, wherein said determining the new value comprises applying the range filter to the first histogram centered on the pixel value in the histogram corresponding to the first pixel.

2. The method of claim 1, further comprising:
applying the filter that comprises the spatial filter and the range filter to a second pixel in the image, comprising:
selecting a second region of pixels within the image, wherein the second region contains a plurality of pixels including the second pixel, and wherein the second region overlaps the first region;
determining a second range of pixel values, wherein the second range is smaller than the first range and greater than the range of pixel values on which the range filter operates;
determining if the respective pixel value for the second pixel is within the second range of pixel values; and
if the respective pixel value for the second pixel value is within the second range of pixel values:
determining a non-overlapping region between the first region and the second region;
generating a second histogram using the first histogram and pixel values in the non-overlapping region; and
determining a new value for the second pixel using the second histogram, wherein said determining the new value for the second pixel comprises applying the range filter to the second histogram centered on the pixel value in the histogram corresponding to the second pixel;
if the respective pixel value for the second pixel is not within the second range of pixel values:
generating the second histogram from scratch based on all the second region without using the first histogram to generate the second histogram; and
determining the new value for the second pixel using the second histogram, wherein said determining the new value for the second pixel comprises applying the range filter to the second histogram centered on the pixel value in the histogram corresponding to the second pixel.

3. The method of claim 2, wherein the respective pixel value for the second pixel is within the second range of pixel values, wherein the second histogram comprises a plurality of bins, wherein each bin represents a frequency of pixels within the second region having pixel values corresponding to that bin, and wherein generating the second histogram involves:
setting frequency values of the second histogram equal to frequency values of the first histogram; and
adjusting the frequency values of the second histogram, wherein said adjusting comprises:

increasing the frequency values that correspond to pixel values for pixels that are in the second region, but are not in the first region; and decreasing the frequency values that correspond to pixel values for pixels that are in the first region, but are not in the second region.

4. The method of claim 1, wherein pixel values in the image are represented by floating point numbers.

5. The method of claim 1, wherein, in addition to the spatial filter and the range filter, the filter that comprises the spatial filter and the range filter further comprises a gradient filter such that the filter is a trilateral filter.

6. The method of claim 1, wherein the method is performed during HDR (High Dynamic Range) tone mapping.

7. A non-transitory computer-readable storage medium storing instructions that when executed by a computer cause the computer to perform a method, the method comprising:

receiving an image to which a filter is to be applied, wherein the image comprises a plurality of pixels each having a respective pixel value; and applying the filter to a first pixel in the image, wherein the filter comprises a spatial filter and a range filter, and wherein said applying comprises:

applying the spatial filter, wherein said applying the spatial filter comprises selecting a first region of pixels within the image, wherein the first region contains a plurality of pixels including the first pixel;

determining a first range of pixel values including the pixel value for the first pixel, wherein the first range is greater than a range of pixel values on which the range filter operates;

generating a first histogram using pixels within the first region whose respective pixel values are within the first range of pixel values, wherein the first histogram comprises a plurality of bins, wherein each bin represents a frequency of pixels within the first region having pixel values corresponding to that bin, wherein pixels within the first region whose respective pixel values are not within the first range of pixel values are not represented in the first histogram; and determining a new value for the first pixel using the first histogram, wherein said determining the new value comprises applying the range filter to the first histogram centered on the pixel value in the histogram corresponding to the first pixel.

8. The computer-readable storage medium of claim 7, wherein the method further comprises:

applying the filter that comprises the spatial filter and the range filter to a second pixel in the image, comprising:

selecting a second region of pixels within the image, wherein the second region contains a plurality of pixels including the second pixel, and wherein the second region overlaps the first region;

determining a second range of pixel values, wherein the second range is smaller than the first range and greater than the range of pixel values on which the range filter operates;

determining if the respective pixel value for the second pixel value is within the second range of pixel values; and if the respective pixel value for the second pixel is within the second range of pixel values:

determining a non-overlapping region between the first region and the second region;

generating a second histogram using the first histogram and pixel values in the non-overlapping region; and determining a new value for the second pixel using the second histogram, wherein said determining the new value for the second pixel comprises applying the range filter to the second histogram centered on the pixel value in the histogram corresponding to the second pixel;

if the respective pixel value for the second pixel is not within the second range of pixel values:

generating the second histogram from scratch based on all the second region without using the first histogram to generate the second histogram; and determining the new value for the second pixel using the second histogram, wherein said determining the new value for the second pixel comprises applying the range filter to the second histogram centered on the pixel value in the histogram corresponding to the second pixel.

9. The computer-readable storage medium of claim 8, wherein the respective pixel value for the second pixel is within the second range of pixel values, wherein the second histogram comprises a plurality of bins, wherein each bin represents a frequency of pixels within the second region having pixel values corresponding to that bin, and wherein generating the second histogram involves:

setting frequency values of the second histogram equal to frequency values of the first histogram; and adjusting the frequency values of the second histogram, wherein said adjusting comprises:

increasing the frequency values that correspond to pixel values for pixels that are in the second region, but are not in the first region; and decreasing the frequency values that correspond to pixel values for pixels that are in the first region, but are not in the second region.

10. The computer-readable storage medium of claim 7, wherein pixel values in the image are represented by floating point numbers.

11. The computer-readable storage medium of claim 7, wherein, in addition to the spatial filter and the range filter, the filter that comprises the spatial filter and the range filter further comprises a gradient filter such that the filter is a trilateral filter.

12. The computer-readable storage medium of claim 7, wherein the method is performed during HDR (High Dynamic Range) tone mapping.

13. An apparatus, comprising: a computer that further comprises:

a receiving mechanism, embodied on a computer-readable medium, which causes the computer to receive an image to which a filter is to be applied, wherein the image comprises a plurality of pixels each having a respective pixel value;

a filtering mechanism, embodied on a computer-readable medium, which causes the computer to apply the filter to a first pixel in the image, wherein the filter comprises a spatial filter and a range filter, and wherein the filtering mechanism comprises:

a first selecting mechanism, embodied on a computer-readable medium, which causes the computer to select a first region of pixels within the image, wherein the first region contains a plurality of pixels including the first pixel, wherein the first selecting mechanism applies the spatial filter;

a generating mechanism, embodied on a computer-readable medium, which causes the computer to:

determine a first range of pixel values including the pixel value for the first pixel, wherein the first range is greater than a range of pixel values on which the range filter operates; and generate a first histogram using pixels within the first region whose respective pixel values are within the first range of pixel values, wherein the first histogram comprises a plurality of bins, wherein each bin represents a frequency of pixels within the first region having pixel values corresponding to that bin, wherein pixels within the first region whose respective pixel values are not within the first range of pixel values are not represented in the first histogram; and a first determining mechanism, embodied on a computer-readable medium, which causes the computer to determine a new value for the first pixel using the first histogram, wherein to determine the new value comprises applying the range filter to the first histogram centered on the pixel value in the histogram corresponding to the first pixel.

14. The apparatus of claim 13, wherein the filtering mechanism is further configured to apply the filter that comprises the spatial filter and the range filter to a second pixel in the image;

wherein the selecting mechanism is further configured to select a second region of pixels within the image, wherein the second region contains a plurality of pixels including the second pixel, and wherein the second region overlaps the first region;

wherein the apparatus comprises a second determining mechanism configured to;

determine a second range of pixel values, wherein the second range is smaller than the first range and greater than the range of pixel values on which the range filter operates; and determine if the respective pixel value for the second pixel is within the second range of pixel values; and wherein the generating mechanism is further configured to:

if the respective pixel value for the second pixel value is within the second range of pixel values:

determine a non-overlapping region between the first region and the second region;

generate a second histogram using the first histogram and pixel values in the non-overlapping region; and if the respective pixel value for the second pixel is not within the second range of pixel values:

generate the second histogram from scratch based on all the second region without using the first histogram to generate the second histogram and wherein the first determining mechanism is further configured to determine a new value for the second pixel using the second histogram, wherein to determine the new value for the second pixel comprises applying the range filter to the second histogram centered on the pixel value in the histogram corresponding to the second pixel.

15. The apparatus of claim 14, wherein the second histogram comprises a plurality of bins, wherein each bin represents a frequency of pixels within the second region having pixel values corresponding to that bin, and wherein the generating mechanism is configured to, when the respective pixel value for the second pixel is within the second range of pixel values:

set frequency values of the second histogram equal to frequency values of the first histogram; and adjust the frequency values of the second histogram, wherein to adjust comprises:

increasing the frequency values that correspond to pixel values for pixels that are in the second region, but are not in the first region; and decreasing the frequency values that correspond to pixel values for pixels that are in the first region, but are not in the second region.

16. The apparatus of claim 13, wherein, in addition to the spatial filter and the range filter, the filter that comprises the spatial filter and the range filter further comprises a gradient filter such that the filter is a trilateral filter.

17. The apparatus of claim 13, wherein the filtering mechanism is operated during HDR (High Dynamic Range) tone mapping.

* * * * *